(12) United States Patent
Schilling

(10) Patent No.: US 7,068,705 B2
(45) Date of Patent: *Jun. 27, 2006

(54) MULTIPLE-INPUT MULTIPLE-OUTPUT (MIMO) SPREAD-SPECTRUM SYSTEM AND METHOD

(75) Inventor: Donald L. Schilling, Palm Beach Gardens, FL (US)

(73) Assignee: Linex Technologies, Inc., West Long Branch, NJ (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/862,198

(22) Filed: Jun. 7, 2004

(65) Prior Publication Data

US 2005/0008065 A1     Jan. 13, 2005

Related U.S. Application Data

(63) Continuation of application No. 10/254,461, filed on Sep. 25, 2002, now Pat. No. 6,757,322, and a continuation-in-part of application No. 09/665,322, filed on Sep. 19, 2000, now Pat. No. 6,466,610, and a continuation-in-part of application No. 09/198,630, filed on Nov. 24, 1998, now Pat. No. 6,128,330.

(51) Int. Cl.
*H04B 1/707* (2006.01)

(52) U.S. Cl. ...................... 375/141; 375/143; 375/144; 375/347; 375/267

(58) Field of Classification Search ................ 375/130, 375/141, 143, 144, 267, 347
See application file for complete search history.

(56) References Cited

U.S. PATENT DOCUMENTS

| | | | |
|---|---|---|---|
| 4,694,467 A | 9/1987 | Mui | |
| 5,657,343 A | 8/1997 | Schilling | |
| 5,859,879 A | 1/1999 | Bolgiano et al. | |
| 5,960,039 A | 9/1999 | Martin et al. | |
| 5,999,560 A | 12/1999 | Ono | |
| 6,026,115 A | 2/2000 | Higashi | |
| 6,069,912 A | 5/2000 | Sawahashi | |

*Primary Examiner*—Temesghen Ghebretinsae
(74) *Attorney, Agent, or Firm*—David Newman

(57) ABSTRACT

A system and method for transmitting a plurality of spread-spectrum signals over a communications channel having fading. The plurality of spread-spectrum signals are radiated by a plurality of antennas, with each antenna preferably spaced by one-quarter wavelength. A plurality of receiver antennas receive the plurality of spread-spectrum signals and a plurality of fading spread-spectrum signals. Each receiver antenna is coupled to a plurality of matched filters having a respective plurality of impulse responses matched to the chip-sequence signals of the plurality of spread-spectrum signals. A RAKE and space-diversity combiner combines, for each respective chip-sequence signal, a respective plurality of detected spread-spectrum signals and a respective multiplicity of detected-multipath-spread-spectrum signals, to generate a plurality of combined signals. The symbol amplitudes can be measured and erasure decoding employed to improve performance.

96 Claims, 5 Drawing Sheets

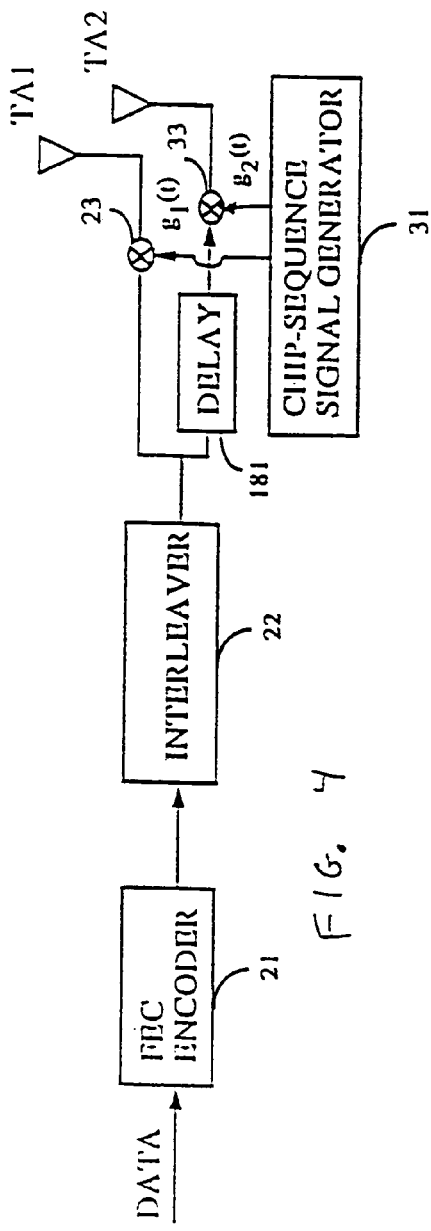
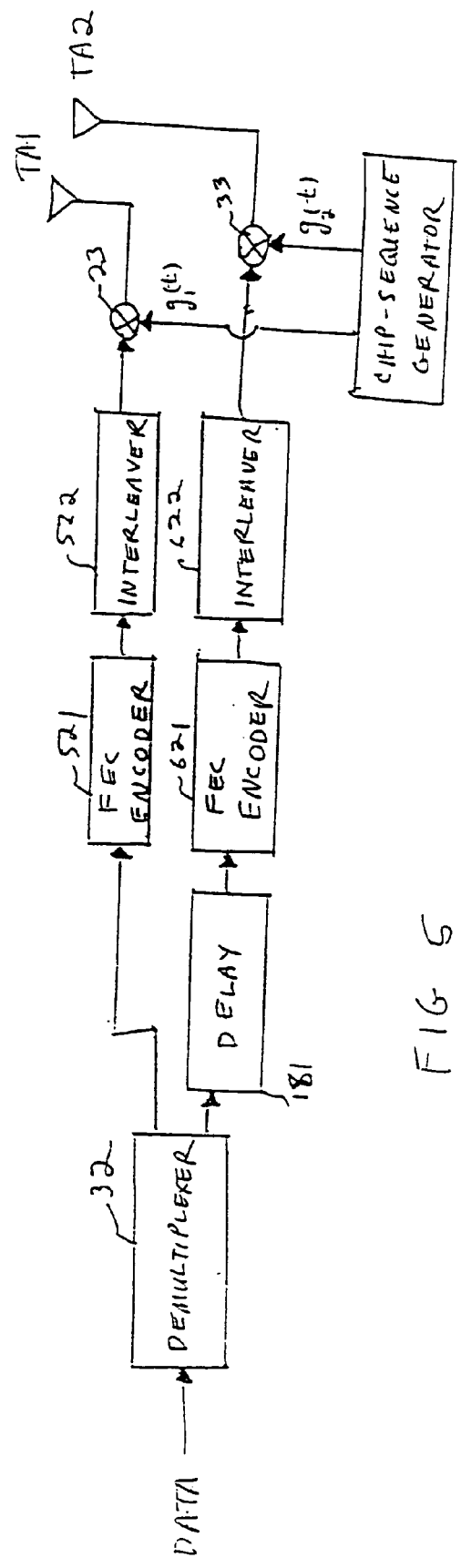
FIG. 4
FIG. 6

MULTIPLE-INPUT MULTIPLE-OUTPUT (MIMO) SPREAD-SPECTRUM SYSTEM AND METHOD

RELATED PATENTS

This patent is a continuation of application Ser. No. 10/254,461, filed Sep. 25, 2002, now U.S. Pat. No. 6,757,322 and stems from a continuation application of U.S. patent application Ser. No. 09/665,322, and filing date of Sep. 19, 2000 now U.S. Pat. No. 6,466,610, entitled SPREAD-SPECTRUM SPACE DIVERSITY AND CODING ANTENNA SYSTEM AND METHOD, with inventor DONALD L. SCHILLING, and a continuation application of U.S. patent application Ser. No. 09/198,630, and filing date of Nov. 24, 1998, entitled EFFECT SHADOW REDUCTION ANTENNA SYSTEM FOR SPREAD SPECTRUM, with inventor DONALD L. SCHILLING which issued on Oct. 3, 2000, as U.S. Pat. No. 6,128,330. The benefit of the earlier filing date of the parent patent application is claimed for common subject matter pursuant to 35 U.S.C. § 120.

BACKGROUND OF THE INVENTION

This invention relates to antennas, and more particularly to reducing the effects of shadowing from a multipath environment, using space diversity and coding.

DESCRIPTION OF THE RELEVANT ART

Data sent from terminal to base, or vice versa, are often shadowed. Shadowing is a function of time, and may be caused by buildings, foliage, vehicles, people, motion of the terminal, etc. Shadowing is the blocking, or attenuating, of the transmitted signal. Shadowing may occur in fixed or mobile systems, and can vary slowly or quickly depending on the situation.

While shadowing has an effect which is similar to multipath, the causes and statistics of shadowing may be very different. For example, the presence of a building may result in total shadowing, independent of time, while multipath, caused by numerous multipath returns, produces a Rayleigh or Ricean fading distribution. Fading due to shadowing and multipath may be reduced by adding a receiver antenna to increase receiver diversity.

Coding techniques using space diversity as well as time, are known as "space-time" codes. In the prior art, with a multiple antenna system, the input to each receive antenna is assumed to have Rayleigh fading. A problem with multiple antenna systems is that a particular antenna output may be shadowed by 6 dB or more to a particular receive antenna. Such shadowing leaves the other antennas to receive a desired signal, effectively destroying one source of data.

SUMMARY OF THE INVENTION

A general object of the invention is to reduce the effects of shadowing and multipath in a fading environment.

Another object of the invention is to improve performance of a spread-spectrum communications system.

An additional object of the invention is to increase capacity of a spread-spectrum communications system.

A further object of the invention is to minimize fading and enhance overall performance in a spread-spectrum communications system.

According to the present invention, as embodied and broadly described herein, an antenna system is provided employing space diversity and coding, for transmitting data having symbols, over a communications channel. The transmitted signal passes through a communications channel having fading caused by multipath as well as shadowing.

In a first embodiment of the invention, the antenna system comprises a forward error correction (FEC) encoder, an interleaver, a demultiplexer, a plurality of spread-spectrum devices, a plurality of transmit antennas, and a plurality of receiver subsystems. Each receiver subsystem includes a receiver antenna and a plurality of matched filters. The receiver system further includes a RAKE and space-diversity combiner, a multiplexer, a de-interleaver, and a decoder.

The FEC encoder encodes the data using an error correction code to generate FEC data. The interleaver interleaves the symbols of the FEC data to generate interleaved data. The demultiplexer demultiplexes the interleaved data into a plurality of subchannels of data. The plurality of spread-spectrum devices, spread-spectrum processes the plurality of subchannels of data with a plurality of chip-sequence signals, respectively. Each chip-sequence signal of the plurality of chip-sequence signals is different from other chip-sequence signals in the plurality of chip-sequence signals. The plurality of spread-spectrum devices thereby generates a plurality of spread-spectrum subchannel signals, respectively. The plurality of transmit antennas radiate, at a carrier frequency using radio waves, the plurality of spread-spectrum-subchannel signals over a communications channel as a plurality of spread-spectrum signals. The plurality of spread-spectrum signals could use binary phase-shift-keying (BPSK) modulation, quadrature phase-shift-keying (QPSK) modulation, differential encoding, etc., and other modulations, which are all well known carrier modulation techniques.

The communications channel imparts fading on the plurality of spread-spectrum signals. The multipath generates a multiplicity of fading spread-spectrum signals. The fading also may include shadowing.

The plurality of receiver subsystems receive the plurality of spread-spectrum signals and the multiplicity of fading spread-spectrum signals from the communications channel. Each receiver subsystem has the receiver antenna for receiving the plurality of spread-spectrum signals, and the plurality of matched filters. Each receiver antenna in the plurality of receiver antennas is spaced from other receiver antennas in the plurality of receiver antennas preferably by at least one-quarter (¼) wavelength, and preferably as far apart as practicable. The present invention includes spacings less than one-quarter wavelength, but with degradation in performance The plurality of matched filters has a plurality of impulse responses matched to the plurality of chip-sequence signals, respectively. The plurality of matched filters detect the plurality of spread-spectrum signals and the multiplicity of fading spread-spectrum signals, as a plurality of detected spread-spectrum signals and a multiplicity of detected-fading spread-spectrum signals, respectively.

A plurality of RAKE and space-diversity combiners combine the plurality of detected spread-spectrum signals and the multiplicity of the detected-fading spread-spectrum signals from each of the plurality of receiver subsystems, to generate a plurality of combined signals. A multiplexer multiplexes a plurality of combined signals thereby generating the multiplexed signal. The de-interleaver de-interleaves the multiplexed signal from the multiplexer, and thereby generates de-interleaved data. The decoder decodes the de-interleaved data.

As an alternative, a preferred embodiment is to select the received version of each received chip-sequence signal at each antenna and combine them in a RAKE. In this embodiment, the space and time combining of each channel from a respective chip-sequence signal occur in a single RAKE receiver. The total number of RAKE receivers is equal to the number of chip-sequence signals, or one or more RAKEs could be time multiplexed to represent the number of chip-sequence signals.

A second embodiment of the invention has an antenna system for transmitting data having symbols over the communications channel having fading caused by multipath and shadowing. In the second embodiment of the invention, as previously described for the first embodiment of the invention, a multiplicity of delay devices is coupled between the interleaver and the plurality of spread-spectrum devices, respectively. A first signal of the plurality of signals of the interleaved data need not be delayed. The other signals of the plurality of signals of interleaved data are delayed, at least one symbol, one from the other, by the multiplicity of delay devices. Each delay device of the multiplicity of delay devices has a delay different from other delay devices of the multiplicity of delay devices relative to the first signal. The multiplicity of delay devices thereby generate a plurality of time-channel signals.

The plurality of spread-spectrum devices has a first spread-spectrum device coupled to the interleaver, and with the other spread-spectrum devices coupled to the multiplicity of delay devices, respectively. The plurality of spread-spectrum devices spread-spectrum process, with a plurality of chip-sequence signals, the first signal and the plurality of time-channel signals as a plurality of spread-spectrum signals. The plurality of transmit antennas radiate at the carrier frequency, using radio waves, the plurality of spread-spectrum signals over the communications channel.

The communications channel imparts fading due to multipath and shadowing on the plurality of spread-spectrum signals. The multipath generates a multiplicity of fading spread-spectrum signals.

The plurality of receiver subsystems receive the plurality of spread-spectrum signals and the multiplicity of fading spread-spectrum signals from the communications channel. Each receiver subsystem includes a receiver antenna for receiving the plurality of spread-spectrum signals and a plurality of matched filters; the plurality of matched filters has a plurality of impulse responses matched to the plurality of chip-sequence signals, respectively. The plurality of matched filters detects the plurality of spread-spectrum signals and the multiplicity of fading spread-spectrum signals, as a plurality of detected spread-spectrum signals and a multiplicity of detected-fading spread-spectrum signals.

A RAKE and space-diversity combiner combines the detected spread-spectrum signal and the multiplicity of detected-fading spread-spectrum signals from each of the plurality of receiver subsystems. This generates a plurality of combined signals. The FEC decoder decodes the de-interleaved signal as decoded data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4 is a block diagram of a transmitter having two codes and two antennas, and a delay on data;

FIG. 5 is a block diagram of a transmitter having two codes and two antennas, and a delay on data, with a separate FEC encoder and bit interleaver for each channel;

DETAILED DESCRIPTION OF THE PREFERRED EMBODIMENTS

Figure 1:
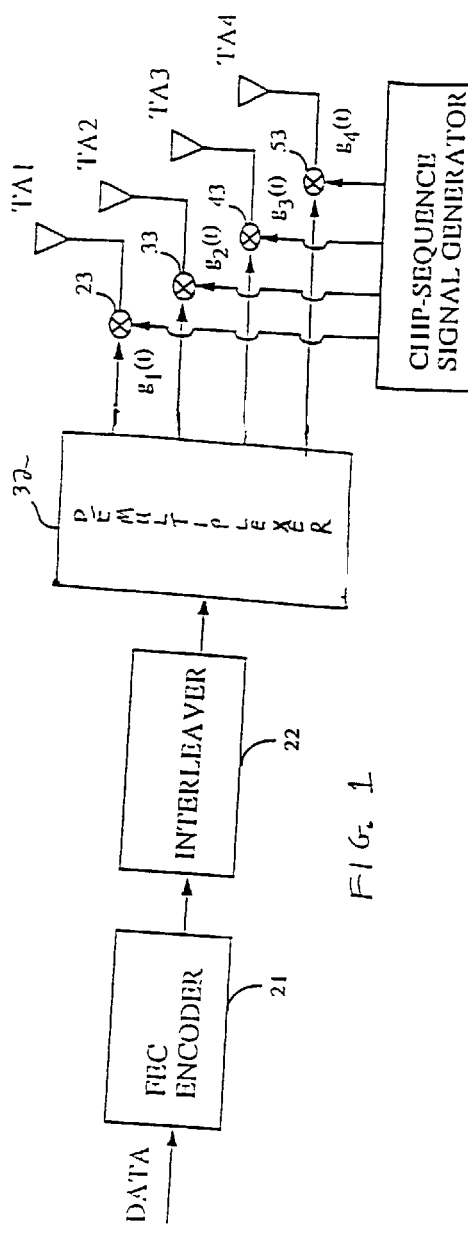
FIG. 1 is a block diagram of a four code transmitter, using four antennas.

Reference now is made in detail to the present preferred embodiments of the invention, examples of which are illustrated in the accompanying drawings, wherein like reference numerals indicate like elements throughout the several views.

The present invention provides a novel approach for reducing the effect of fading due to shadowing and multipath, through the use of multiple antennas at the terminal and also at the base station, as well as a single RAKE/maximal ratio combiner to combine all time and space signals. Previous solutions have assumed multiple antennas at the base, where space diversity is then applied. Also, each antenna receiver has an individual RAKE. Placing multiple antennas at the terminal, however, can result in a significant improvement in system performance. The use of maximal ratio combining, RAKE and erasure decoding further enhance system performance.

As illustratively shown in FIGS. 1–6, the present invention broadly includes an antenna system employing time (RAKE) and space (antenna) diversity and coding of spread-spectrum signals. The antenna system is for transmitting data having symbols over a communications channel. The symbols may be bits, or may be based on pairs of bits or groups of bits. The communications channel is assumed to have fading due to multipath and shadowing.

The antenna system broadly includes forward error correction (FEC) means, interleaver means, demultiplexer means, spread-spectrum means, a plurality of transmit antennas, a plurality of receiver subsystems, RAKE and space-diversity means, multiplexer means, de-interleaver means, and decoder means. Each receiver subsystem includes receiver-antenna means and matched-filter means.

The interleaver means is coupled between the demultiplexer means and the FEC means. The spread-spectrum means is coupled between the demultiplexer means and the plurality of transmit antennas. Alternatively, the FEC means is coupled between the demultiplexer means and the interleaver means, and the spread-spectrum means is coupled to the interleaver means. The communications channel is between the plurality of transmit antennas and the plurality of receiver subsystems.

Each receiver subsystem has receiver-antenna means exposed to the communications channel. The matched filter means is coupled to the receiver-antenna means.

The RAKE and space-diversity means is coupled to each matched filter means of the plurality of receiver subsystems, and the multiplexer means is coupled to the RAKE and space-diversity means. The de-interleaver means is coupled to the RAKE and space-diversity means, and the decoder means is coupled to the de-interleaver means.

The FEC means FEC encodes the data, thereby generating FEC data. FEC data is defined herein to be FEC encoded data. Forward-error-correction encoding is well known in the art, and the use of a particular FEC code is a design choice. The interleaver means interleaves symbols of the FEC data, thereby generating interleaved data. Interleaved data is defined herein to be interleaved FEC data. Interleaving, as is well known in the art, randomizes the errors. The demultiplexer means demultiplexes the interleaved data into a plurality of subchannels of data.

The spread-spectrum means spread-spectrum processes the plurality of subchannels of data with a plurality of chip-sequence signals, respectively. Each chip-sequence signal is different from other chip-sequence signals in the plurality of chip-sequence signals. The spread-spectrum means thereby generates a plurality of spread-spectrum-subchannel signals, respectively. Each spread-spectrum-subchannel signal is defined by a respective chip-sequence signal. In a preferred embodiment, each chip-sequence signal is designed to be orthogonal to other chip-sequence signals in the plurality of chip-sequence signals, when received at the receiver, neglecting multipath. In practice, however, orthogonality may not be realized.

The plurality of transmit antennas has each transmitter antenna spaced from other antennas in the plurality of transmit antennas, preferably by at least a quarter wavelength at a carrier frequency. If the transmitter antennas are spaced by less than a quarter wavelength, performance degrades. The present invention includes antennas spaced less than a quarter wavelength, with spacing of at least a quarter wavelength being a preferred embodiment. The plurality of transmit antennas radiates at the carrier frequency, using radio waves, the plurality of spread-spectrum-subchannel signals, respectively, over the communications channel, as a plurality of spread-spectrum signals. The carrier frequency typically is the frequency of a carrier signal generated by an oscillator, as is well known in the art. The plurality of spread-spectrum signals is mixed or multiplied by the carrier signal. Appropriate oscillator, mixer, amplifier and filter can be employed to assist radiating the plurality of spread-spectrum signals at the carrier frequency. Various modulations, such as QPSK, BPSK, differential encoding, etc., may be use as a carrier modulation for the plurality of spread-spectrum signals.

The communications channel imparts fading due to multipath and shadowing on the plurality of spread-spectrum signals. The communications channel thereby generates a plurality of fading spread-spectrum signals.

The plurality of receiver subsystems receive the plurality of spread-spectrum signals, arriving from the plurality of transmit antennas through the communications channel, and the multiplicity of fading spread-spectrum signals from the communications channel. Within each receiver subsystem, the receiver-antenna means receives a plurality of spread-spectrum signals and the multiplicity of fading spread-spectrum signals. The matched-filter means has a plurality of impulse responses matched to the plurality of chip-sequence signals, respectively. The matched-filter means detects the plurality of spread-spectrum signals and the multiplicity of fading spread-spectrum signals, as a plurality of detected spread-spectrum signals and a multiplicity of detected-fading spread-spectrum signals, respectively.

The RAKE and space-diversity means combines the plurality of detected spread-spectrum signals and the multiplicity of detected-fading spread-spectrum signals from each of the plurality of receiver subsystems. The RAKE and space-diversity means thereby generates a plurality of combined signals.

The multiplexer means multiplexes the plurality of combined signals, as a multiplexed signal. The de-interleaver means de-interleaves the multiplexed signal from the multiplexer, thereby generating a de-interleaved signal. The decoder means decodes the de-interleaved signal.

Figure 2:
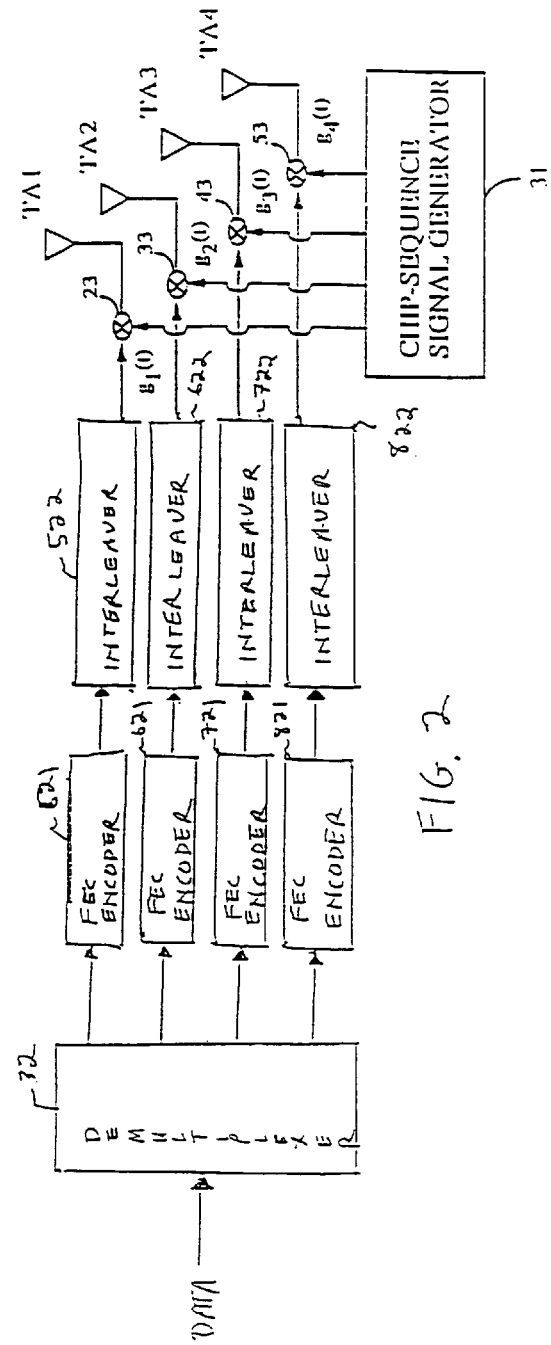
FIG. 2 is a block diagram of a four code transmitter, using four antennas and separate FEC encoders and bit interleavers for each channel.
Figure 3:
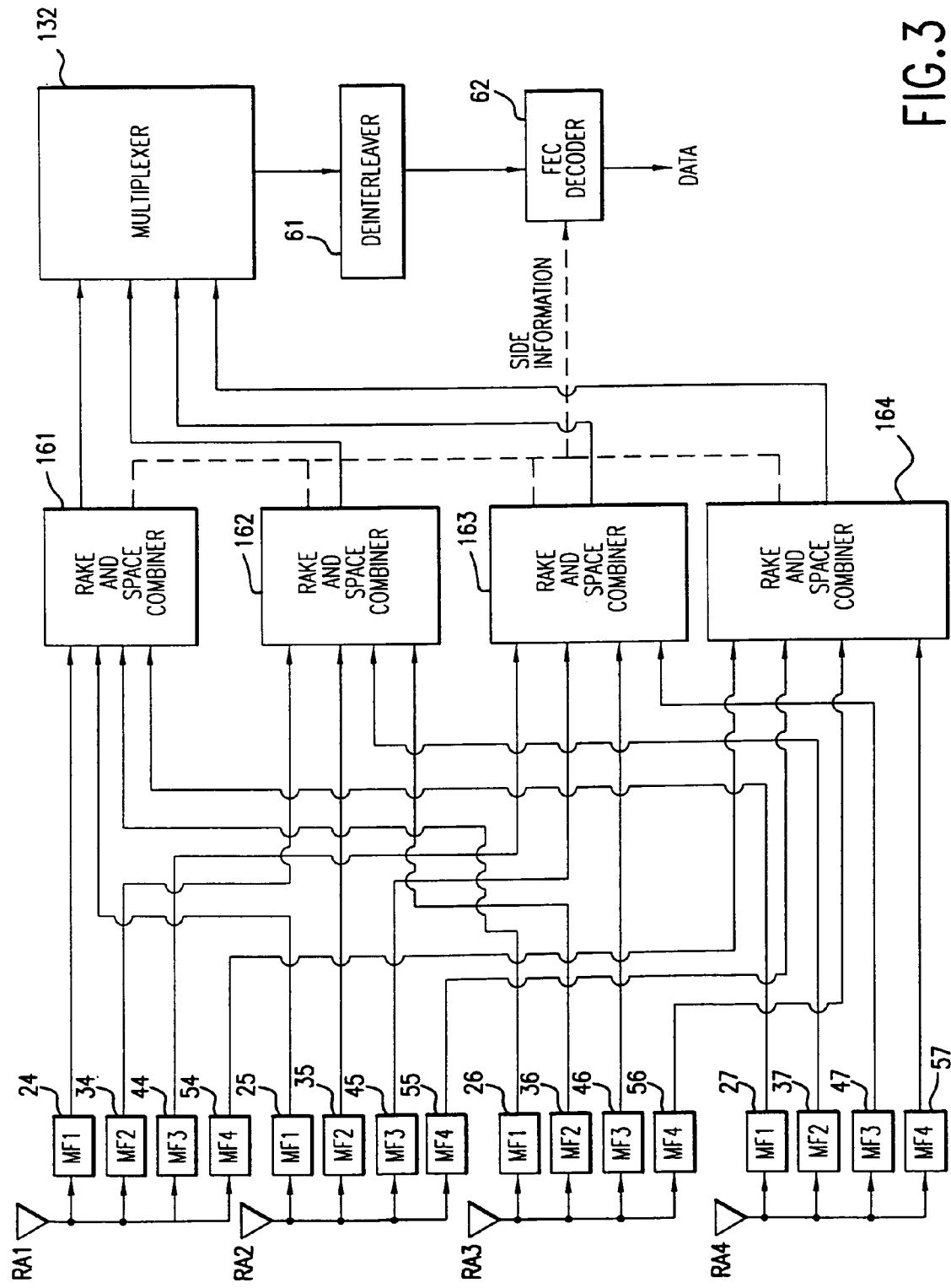
FIG. 3 is a block diagram of a receiver system having four antennas, with four matched filters per antenna.

FIGS. 1–3 illustratively show a system with four transmit antennas TA1, TA2, TA3, TA4 and four receive antennas RA1, RA2, RA3, RA4. The number of transmit antennas usually is not the same as the number of receiver antennas. In FIG. 1, the data are first forward-error-correction (FEC) encoded by FEC encoder 21 and interleaved by interleaver 22, and then demultiplexed by demultiplexer 32 into four data streams. The interleaving, FEC encoding, demultiplexing process alters the system performance. Alternatively, as shown in FIG. 2, the data could first be demultiplexed by demultiplexer 32 and then each data stream could be FEC encoded by a plurality of FEC encoders 521, 621, 721, 821 and interleaved by a plurality of interleavers 522, 622, 722, 822. The multipath FEC/interleavers could be built as individual devices, or as a single time-multiplexed device.

The first, second, third and fourth chip-sequence signals, $g_1(t)$, $g_2(t)$, $g_3(t)$, and $g_4(t)$, typically are pseudonoise (PN) spreading sequences. Since the transmit antennas are spaced more than one-quarter wavelength with respect to the carrier frequency, the chip-sequence signals can be adjusted to be orthogonal to a specific receiver antenna but not to all receiver antennas simultaneously. Thus, orthogonality is not required. The antenna could be "smart", e.g., steerable or phased array, however, ordinary omnidirectional antennas at the terminal are often most practical. Thus, on a car, omnidirectional antennas may be preferred, while in an office or home, a directional antenna may be preferred.

In the exemplary arrangement shown in FIG. 1, the FEC means is embodied as a forward-error-correction (FEC) encoder 21 and the interleaver means is embodied as an interleaver 22. The demultiplexer means is embodied as a demultiplexer 32 and the spread-spectrum means is embodied as a plurality of spread-spectrum devices 23, 33, 43, 53, and a chip-sequence signal generator 31. The spread-spectrum means alternatively may be embodied as an application specific integrated circuit (ASIC) with a plurality of matched filters, charged coupled devices (CCD) or, alternatively, surface-acoustic-wave (SAW) devices, as is well known in the art. The interleaver 22 is coupled between FEC encoder 21 and the demultiplexer 32. The plurality of spread-spectrum devices 23, 33, 43, 53 is coupled to the chip-sequence signal generator 31, and between the demultiplexer 32, and the plurality of transmit antennas TA1, TA2, TA3, and TA4.

The FEC encoder 21 encodes the data to generate FEC data. FEC encoding is well known in the art. A particular choice of an FEC encoding technique and code is a design choice. The interleaver 22 interleaves the FEC data to generate interleaved data. The interleaver selection is a design choice. The demultiplexer 32 demultiplexes the interleaved data into a plurality of subchannels of data.

In FIG. 2, the FEC means is embodied as a plurality of FEC encoders 521, 621, 721, 821 and the interleaver means is embodied as a plurality of interleavers 522, 622, 722, 822. The demultiplexer 32 first demultiplexes the data into a plurality of sub-data streams. The plurality of FEC encoders 521, 621, 721, 821 FEC encode the plurality of sub-data streams into a plurality of FEC-sub-data streams, respectively. The plurality of interleavers 522, 622, 722, 822 interleave the plurality of FEC-sub-data streams into the plurality of subchannels, respectively.

In FIGS. 1 and 2, a chip-sequence generator 31 generates the plurality of chip-sequence signals. A chip-sequence signal typically is generated from a pseudonoise (PN) sequence, as is well known in the art. Each chip-sequence signal is different from other chip-sequence signal in the plurality of chip-sequence signals. In an embodiment, each chip-sequence signal may be orthogonal to other chip-sequence signals in the plurality of chip-sequence signals.

The plurality of spread-spectrum devices 23, 33, 43, 53 spread-spectrum process the plurality of subchannels of data with the plurality of chip-sequence signals, respectively. Each spread-spectrum-subchannel signal of the plurality of spread-spectrum-subchannel signals is defined by a respective chip-sequence signal from the plurality of chip-sequence signals. The plurality of spread-spectrum devices thereby generate a plurality of spread-spectrum-subchannel signals, respectively.

The plurality of transmit antennas TA1, TA2, TA3, TA4 has each transmitter antenna of the plurality of transmit antennas preferably spaced from other antennas of the plurality of transmit antennas preferably by at least a quarter wavelength at a carrier frequency. This provides independence of transmitted signals. The plurality of transmit antennas TA1, TA2, TA3, TA4 radiate at the carrier frequency using radio waves, the plurality of spread-spectrum-subchannel signals over the communications channel as a plurality of spread-spectrum signals. Appropriate oscillator product device and filter may be added to shift the plurality of spread-spectrum-subchannel signals to a desired carrier frequency. Amplifiers may be added as required.

The communications channel imparts fading on the plurality of spread-spectrum signals. The fading generates a multiplicity of fading spread-spectrum signals, some of which may have shadowing and multipath. The shadowing may be from buildings, foliage, and other causes of multipath and shadowing.

The spread-spectrum processing typically includes multiplying the plurality of subchannels of data by the plurality of chip-sequence signals, respectively. In an alternative embodiment, if a plurality of matched filters or SAW devices was employed in place of the spread-spectrum devices, then the plurality of matched filters or SAW devices would have a plurality of impulse responses, respectively, matched to the plurality of chip-sequence signals, respectively. If programmable matched filters were employed, then the plurality of impulse responses of the plurality of matched filters may be set by the plurality of chip-sequence signals or other control signals, from the chip-sequence signal generator 31 or other controller.

At the receiver, the plurality of receiver subsystems receives the plurality of spread-spectrum signals and the multiplicity of fading spread-spectrum signals from the communications channel. Each receiver subsystem of the plurality of receiver subsystem has a receiver antenna. As illustratively shown in FIG. 3, the plurality of receiver subsystems includes a plurality of receiver antennas RA1, RA2, RA3, RA4, respectively. The plurality of receiver antennas RA1, RA2, RA3, RA4 has each receiver antenna of the plurality of receiver antennas preferably spaced from other antennas of the plurality of receiver antennas preferably by at least one-quarter wavelength at the carrier frequency. Each receiver subsystem may include receiver circuitry which amplifies, filters, translates and demodulates received signals to baseband or an intermediate frequency (IF) for processing by the matched filter. Such receiver circuitry is well known in the art.

Each receiver subsystem has a respective receiver antenna coupled to a respective plurality of matched filters. The first receiver subsystem, by way of example, has the first receiver antenna RA1 coupled to a first plurality of matched filters 24, 34, 44, 54. The second receiver antenna RA2 is coupled to a second plurality of matched filters 25, 35, 45, 55. The third receiver antenna RA3 is coupled to a third plurality of matched filters 26, 36, 46, 56. The fourth receiver antenna RA4 is coupled to a fourth plurality of matched filters 27, 37, 47, 57. Each receiver antenna in the plurality of receiver antennas RA1, RA2, RA3, RA4, receives a plurality of spread-spectrum signals and the multiplicity of fading spread-spectrum signals.

For each receiver antenna, as shown in FIG. 3, by way of example, the plurality of matched filters includes a matched filter having a impulse response MF1 matched to a first chip-sequence signal $g_1(t)$; a matched filter having a impulse response MF2 matched to a second chip-sequence signal $g_2(t)$; a matched filter having an impulse response MF3 matched to a third chip-sequence signal $g_3(t)$; and, a matched filter having an impulse response MF4 matched to a fourth chip-sequence signal $g_4(t)$. More particularly, the first plurality of matched filters 24, 34, 44, 54, in FIG. 3, has a first matched filter 24 with an impulse response MF1 matched to a first chip-sequence signal $g_1(t)$ in the plurality of chip-sequence signals; a second matched filter 34 with an impulse response MF2 matched to a second chip-sequence signal $g_2(t)$ in the plurality of chip-sequence signals; a third matched filter 44 with an impulse response MF3 matched to a third chip-sequence signal $g_3(t)$ in the plurality of chip-sequence signals; and a fourth matched filter with an impulse response MF4 matched to a fourth chip-sequence signal $g_4(t)$ in the plurality of chip-sequence signals. The second plurality of matched filters 25, 35, 45, 55, in FIG. 3, has a fifth matched filter 25 with an impulse response MF1 matched to the first chip-sequence signal $g_1(t)$ in the plurality of chip-sequence signals; a sixth matched filter 35 with an impulse response MF2 matched to the second chip-sequence signal $g_2(t)$ in the plurality of chip-sequence signals; a seventh matched filter 45 with an impulse response MF3 matched to the third chip-sequence signal $g_3(t)$ in the plurality of chip-sequence signals; and an eighth matched filter 55 with an impulse response MF4 matched to the fourth chip-sequence signal $g_4(t)$ in the plurality of chip-sequence signals. The third plurality of matched filters 26, 36, 46, 56, in FIG. 3, has a ninth matched filter 26 with an impulse response MF1 matched to the first chip-sequence signal $g_1(t)$ in the plurality of chip-sequence signals; a tenth matched filter 36 with an impulse response MF2 matched to the second chip-sequence signal $g_2(t)$ in the plurality of chip-sequence signals; an eleventh matched filter 46 with an impulse response MF3 matched to a third chip-sequence signal $g_3(t)$ in the plurality of chip-sequence signals; and a twelfth matched filter 56 with an impulse response MF4 matched to a fourth chip-sequence signal $g_4(t)$ in the plurality of chip-sequence signals. The fourth plurality of matched filters 27, 37, 47, 57, in FIG. 3, has a thirteenth matched filter 27 with an impulse response MF1 matched to the first chip-sequence signal $g_1(t)$ in the plurality of chip-sequence signals; a fourteenth matched filter 37 with an impulse response MF2 matched to the second chip-sequence signal $g_2(t)$ in the plurality of chip-sequence signals; a fifteenth matched filter 47 with an impulse response MF3 matched to the third chip-sequence signal $g_3(t)$ in the plurality of chip-sequence signals; and a sixteenth matched filter 57 with an impulse response MF4 matched to the fourth chip-sequence signal $g_4(t)$ in the plurality of chip-sequence signals. Thus, each plurality of matched filters has a plurality of impulse responses MF1, MF2, MF3, MF4 matched to the plurality of chip-sequence signals, $g_1(t)$, $g_2(t)$, $g_3(t)$, $g_4(t)$, respectively.

Alternatively, all four antennas could be coupled to a single radio frequency (RF) RF-IF down converter, with in-phase and quadrature-phase components being formed, and a single matched filer for each impulse response. Thus, there would be a single matched filter with the impulse response MF1, there would be a single matched filter with the impulse response MF2, there would be a single matched filter with the impulse response MF3, and there would be a single matched filter with the impulse response MF4.

In FIG. 3, the first plurality of matched filters 24, 34, 44, 54, by way of example, detects from the plurality of spread-spectrum signals and the multiplicity of fading spread-spectrum signals, a first plurality of detected spread-spectrum signals and a first multiplicity of detected fading spread-spectrum signals, respectively. The second plurality of matched filters 25, 35, 45, 55 detects from the plurality of spread-spectrum signals and the multiplicity of fading spread-spectrum signals, a second plurality of detected spread-spectrum signals and a second multiplicity of detected fading spread-spectrum signals, respectively. The third plurality of matched filters 26, 36, 46, 56 detects from the plurality of spread-spectrum signals and the multiplicity of fading spread-spectrum signals, a third plurality of detected spread-spectrum signals and a third multiplicity of detected fading spread-spectrum signals, respectively. The fourth plurality of matched filters 27, 37, 47, 57 detects from the plurality of spread-spectrum signals and the multiplicity of fading spread-spectrum signals, a fourth plurality of detected spread-spectrum signals and a fourth multiplicity of detected fading spread-spectrum signals, respectively.

The plurality of RAKE and space-diversity combiners combines each plurality of detected spread-spectrum signals and each multiplicity of detected-fading spread-spectrum signals, respectively, from each receiver subsystem. This generates a plurality of combined signals. More particularly, as depicted in FIG. 3, four RAKE and space-diversity combiners are used, with each respective RAKE and space-diversity combiner corresponding to a chip-sequence signal. A first RAKE and space-diversity combiner 161 is coupled to the first matched filter 24, the fifth matched filter 25, the ninth matched filter 26, and the thirteenth matched filter 27, all of which have an impulse response matched to the first chip-sequence signal. The plurality of spread-spectrum signals and the multiplicity of fading spread-spectrum signals, which have a spread-spectrum subchannel defined by the first chip-sequence signal, and detected by any or all of the first matched filter 24, the fifth matched filter 25, the ninth matched filter 26 and the thirteenth matched filter 27, are combined by the first RAKE and space-diversity combiner 161. At the output of the first RAKE and space-diversity combiner 161 is a first combined signal. The first RAKE and space-diversity combiner 161 may use any of a number of techniques for combining signals, such as selecting the four strongest signals and adding their strengths, maximal ratio combining, maximal likelihood combining, etc. RAKE and combining techniques are well known in the art.

A second RAKE and space-diversity combiner 162 is coupled to the second matched filter 34, the sixth matched filter 35, the tenth matched filter 36, and the fourteenth matched filter 37, all of which have an impulse response matched to the second chip-sequence signal. The plurality of spread-spectrum signals and the multiplicity of fading spread-spectrum signals, which have a spread-spectrum subchannel defined by the second chip-sequence signal, and detected by any or all of the second matched filter 34, the sixth matched filter 35, the tenth matched filter 36 and the fourteenth matched filter 37, are combined by the second RAKE and space-diversity combiner 162. At the output of the second RAKE and space-diversity combiner 162 is a second combined signal. The second RAKE and space-diversity combiner 162 may use any of a number of techniques for combining signals, such as selecting the four strongest signals and adding their strengths, maximal ratio combining, maximal likelihood combining, etc. RAKE and combining techniques are well known in the art.

A third RAKE and space-diversity combiner 163 is coupled to the third matched filter 44, the seventh matched filter 45, the eleventh matched filter 46, and the fifteenth matched filter 47, all of which have an impulse response matched to the third chip-sequence signal. The plurality of spread-spectrum signals and the multiplicity of fading spread-spectrum signals, which have a spread-spectrum subchannel defined by the third chip-sequence signal, and detected by any or all of the third matched filter 44, the seventh matched filter 45, the eleventh matched filter 46 and the fifteenth matched filter 47, are combined by the third RAKE and space-diversity combiner 163. At the output of the third RAKE and space-diversity combiner 163 is a third combined signal. The third RAKE and space-diversity combiner 163 may use any of a number of techniques for combining signals, such as selecting the four strongest signals and adding their strengths, maximal ratio combining, maximal likelihood combining, etc. RAKE and combining techniques are well known in the art.

A fourth RAKE and space-diversity combiner 164 is coupled to the fourth matched filter 54, the eighth matched filter 55, the twelfth matched filter 56, and the sixteenth matched filter 57, all of which have an impulse response matched to the fourth chip-sequence signal. The plurality of spread-spectrum signals and the multiplicity of fading spread-spectrum signals, which have a spread-spectrum subchannel defined by the fourth chip-sequence signal, and detected by any or all of the fourth matched filter 54, the eighth matched filter 55, the twelfth matched filter 56 and the sixteenth matched filter 57, are combined by the fourth RAKE and space-diversity combiner 164. At the output of the fourth RAKE and space-diversity combiner 164 is a fourth combined signal. The fourth RAKE and space-diversity combiner 164 may use any of a number of techniques for combining signals, such as selecting the four strongest signals and adding their strengths, maximal ratio combining, maximal likelihood combining, etc. RAKE and combining techniques are well known in the art.

The multiplexer 132 is coupled to the plurality of RAKE and space-diversity combiners. As illustratively shown in FIG. 3, the multiplexer 132 is coupled to the first RAKE and space-diversity combiner 161, to the second RAKE and space-diversity combiner 162, to the third RAKE and space-diversity combiner 163, and to the fourth RAKE and space-diversity combiner 164. The multiplexer 132 multiplexes the first combined signal, the second combined signal, the third combined signal and the fourth combined signal, to generate a multiplexed signal. Thus, more generally, the multiplexer 132 multiplexes the plurality of combined signals to generate the multiplexed signal. The de-interleaver 61 de-interleaves the multiplexed signal from the multiplexer 132 to generate a de-interleaved signal, and the FEC decoder 62 decodes the de-interleaved signal to output the data. Buffer or memory circuits may be inserted between the multiplexer 132 and de-interleaver 61, for storing a plurality of multiplexed signals before the de-interleaver. Alternatively, the memory circuits may be incorporated as part of the de-interleaver.

In use, data are encoded by FEC encoder 21 as FEC data, and the FEC data are interleaved by interleaver 22 generating interleaved data. The demultiplexer 32 demultiplexes the interleaved data into a plurality of subchannels and the plurality of spread-spectrum devices 23, 33, 43, 53 spread-spectrum process the plurality of subchannels of data with a plurality of chip-sequence signals, respectively. The spread-spectrum processing generates a plurality of spread-spectrum-subchannel signals, respectively.

The plurality of transmit antennas radiate the plurality of spread-spectrum-subchannel signals as a plurality of spread-spectrum signals, respectively, over the communications channel.

At the receiver, a plurality of receiver antennas RA1, RA2, RA3, RA4 receive the plurality of spread-spectrum signals and the multiplicity of fading spread-spectrum signals. At each receiver antenna, and by way of example, the first receiver antenna RA1, there are a plurality of matched filters which detect the plurality of spread-spectrum signals and the multiplicity of fading spread-spectrum signals, as a plurality of detected spread-spectrum signals and a multiplicity of detected-fading spread-spectrum signals, respectively. The plurality of RAKE and space-diversity combiners 161, 162, 163, 164 combine the plurality of detected spread-spectrum signals and the multiplicity of detected-fading spread-spectrum signals from each of the plurality of receiver subsystems, thereby generating a plurality of combined signals.

The multiplexer 132 multiplexes the plurality of combined signals as a multiplexed signal. The de-interleaver 61 de-interleaves the multiplexed signal, and the FEC decoder 62 decodes the de-interleaved signal.

Since the symbol amplitudes are readily available, the presence of a small or low level symbol amplitude, even after coding, is a good indication of a processing error. Thus, erasure decoding is preferred in this system to improve performance. During RAKE and space combining, the noise level in each symbol also is measured. This is readily done in a matched filter by sampling the matched filter at a time, not being the symbol sampling time. The noise level at each symbol is recorded or stored in memory, and any significant increase above a predefined threshold, such as 3 dB, is transmitted to the FEC decoder for erasure decoding. Erasure decoding is well known in the art.

As an example of the performance improvement resulting from the present invention, consider that a single transmitter antenna and a single receiver antenna are employed in a system. Let the probability of being shadowed be q. Then q represents the fractional outage time. The order of combining is important if each transmitter antenna sends different data. If each transmitter antenna sent the same data, then the ordering, with appropriate delays, is not important.

Consider using a single transmitter antenna and M receiver antennas. Assuming independence, the probability of a blocked transmission is $q^M$. Further, the multipath outputs at each receiver are combined using RAKE (time diversity), and then the resulting output at each receiver is combined (space diversity). In the antenna system, the transmitted power, to each receiver antenna, is $P_T$ and the processing gain is PG.

In the above example, assume independence, that is, the probability of being blocked to a first receiver antenna, RA1, does not alter the probability of being blocked to a second receiver antenna, RA2, for example. In many cases, however, this assumption may not be correct. A large building may block a first receiver antenna, RA1, a second receiver antenna, RA2, and a third receiver antenna, RA3, from a user's transmitter antenna. In such a situation it is often beneficial to transmit from several transmitting antennas. In a system employing N transmit antennas and M receiver antennas, the transmitted power from each transmitter antenna is reduced by N and the processing gain is increased by N. However, the interference also is increased by N. Thus, there is no signal-to-noise ratio (SNR) improvement in a Gaussian channel, and the advantage of such a system is increased access, i.e., significantly less outage time in a fading channel, a consideration needed for wireless system performance to approach that of a wired system.

Figure 6:
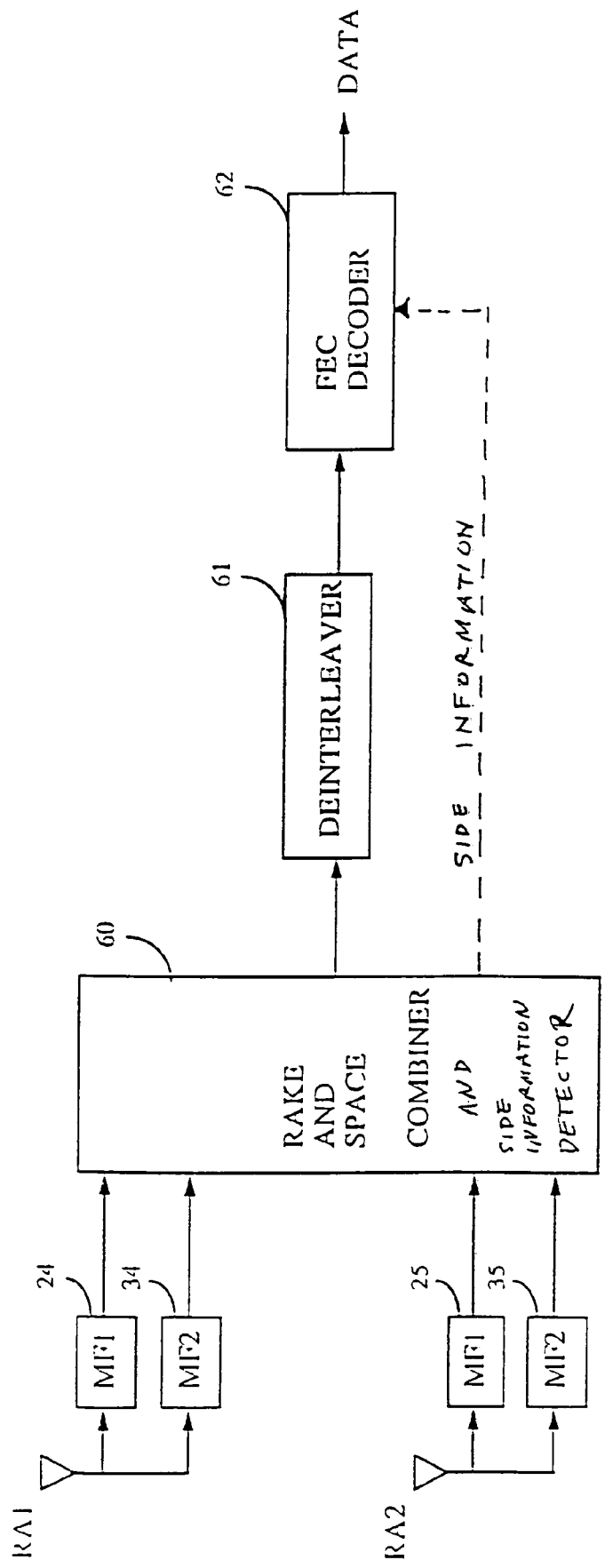
FIG. 6 is a block diagram of a receiver system having two receiver antennas, and two matched filters per antenna.

A space coding technique is shown in FIGS. 4, 5 and 6. Note that the data are interleaved and FEC encoded using a rate R=½ code, such as a convolutional code. The same data then is transmitted over all transmit antennas. In FIGS. 4 and 5, two transmit antennas are shown. In this system, after performing the RAKE operation, two receiver systems perform a standard space diversity maximal-ratio-combining to optimize performance.

Assume that each transmission is received by all four receiver antennas. Then such receiver performs a RAKE reception for each transmitter antenna's signal. These signals are then combined using maximal ratio combining for space diversity. The resulting output of each antenna can then be combined. Of course, any order of combining yields the same result and all combining from all receiver antennas can be done simultaneously (RAKE and space diversity). The order depends on system implementation and does not affect performance. Erasure decoding may be employed at the FEC decoder.

The second embodiment of the antenna system is shown in FIGS. 4, 5 and 6. In FIG. 4, the invention includes FEC encoder 21, coupled to the interleaver 22. From the interleaver 22, the system includes at least one delay device 181 and at least two spread-spectrum devices 23, 33. The system may include a plurality of delay devices, with each delay device having a delay different from other delay devices in the plurality of delay devices. The delay device 181 delays the interleaved data going to the second spread-spectrum device 33. The first spread-spectrum device 23 spread-spectrum processes the interleaved data with the first chip-sequence signal from the chip-sequence generator 31, and the second spread-spectrum device 33 spread-spectrum processes the delayed version of the interleaved data with the second chip-sequence signal from chip-sequence sequence signal generator 31. The first transmitter antenna TA1 radiates the first spread-spectrum signal from the first spread-spectrum device 23, and the second transmitter antenna TA2 radiates the second spread-spectrum signal from the second spread-spectrum device 33.

An alternative to FIG. 4 is shown in FIG. 5. Data are first demultiplexed by demultiplexer 32 into a first stream of data and a second stream of data. The second stream of data is delayed by delay device 181 with respect to the first stream of data. The first stream of data is FEC encoded by first FEC encoder 521 and interleaved by first interleaver 622. The delayed second stream of data is FEC encoded by second FEC encoder 621 and interleaved by second interleaver 622.

The receiver has a multiplicity of receiver subsystems which include a plurality of receiver antennas. Each subsystem corresponding to a receiver antenna has a plurality of matched filters. As shown in FIG. 6, by way of example, a first receiver antenna RA1 and a second receiver antenna RA2 are shown. The first receiver antenna RA1 is coupled to a first matched filter 24 and a second matched filter 34. The second receiver antenna RA2 is coupled to a fifth matched filter 25 and a sixth matched filter 35. The RAKE and space-diversity combiner 60 combines the outputs from the first matched filter 24, the second matched filter 34, the fifth matched filter 25, and the sixth matched filter 35 to form a combined signal. The de-interleaver 61 de-interleaves the combined signal, and the FEC decoder 62 decodes the de-interleaved signal.

As an alternative to the embodiments described in FIGS. 4–6, an identical chip-sequence signal can be used for the plurality of chip-sequence signals. In this alternative, only a single matched filter having an impulse response matched to the chip-sequence signal, is required. Each transmitted signal is delayed by at least one chip.

Figure 7:
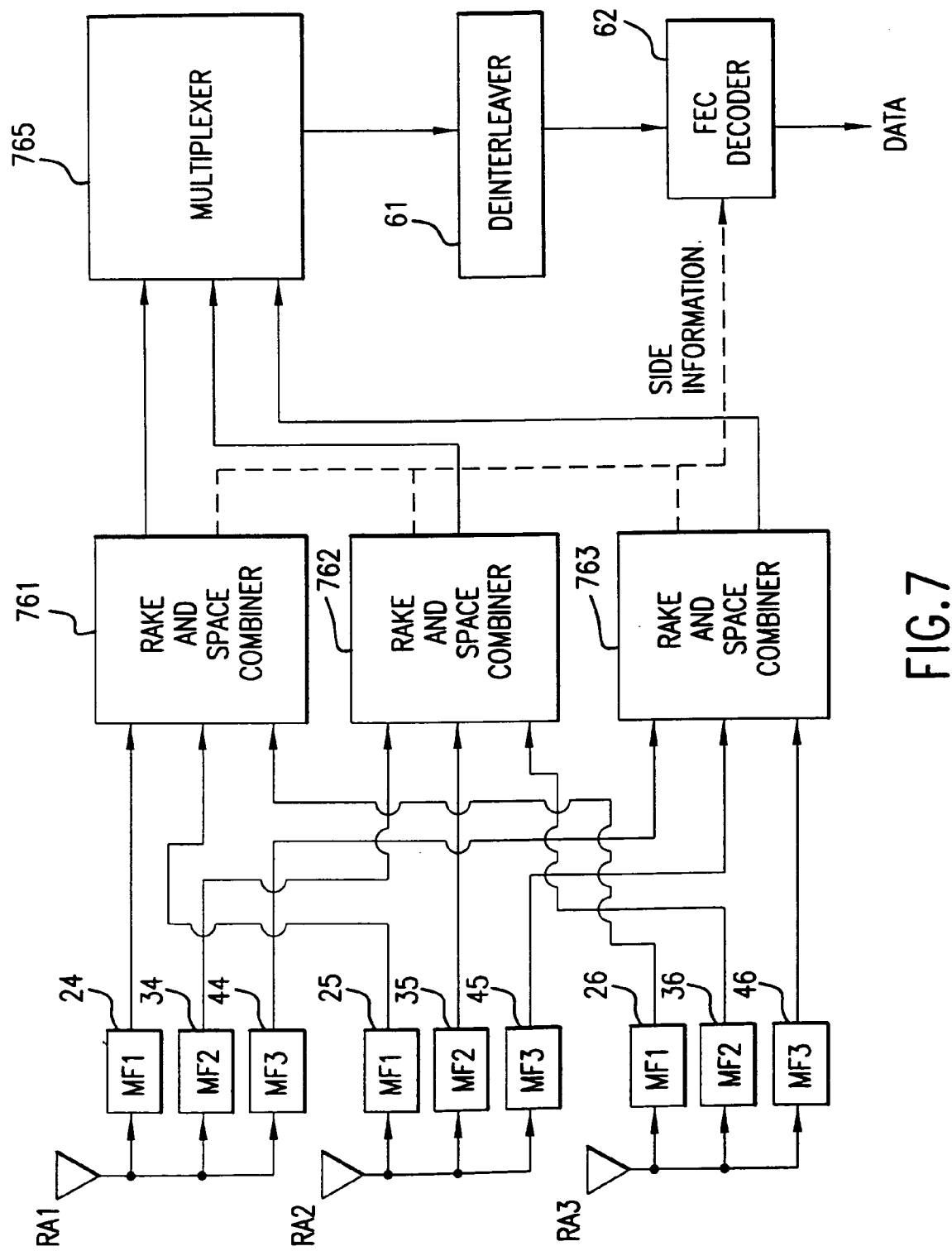
FIG. 7 is a block diagram of a receiver having three antennas and three rake and space combiners, coupled to a multiplexer.

FIG. 7 is a block diagram of a receiver system having a plurality of matched filters 24, 25, 26, 34, 35, 36, 44, 45, 46, coupled to a receiver antenna. As with FIG. 3, the plurality of matched filters 24, 25, 26, 34, 35, 36, 44, 45, 46 has a plurality of impulse responses matched to the plurality of chip-sequence signals, respectively. The plurality of matched filters 24, 25, 26, 34, 35, 36, 44, 45, 46 detects the plurality of spread-spectrum signals and the multiplicity of fading spread-spectrum signals, as a plurality of detected spread-spectrum signals and a multiplicity of detected-fading spread-spectrum signals, respectively.

Also illustrated in FIG. 7 is a plurality of RAKE and space-diversity combiners 761, 762, 763, coupled to the plurality of matched filters 24, 25, 26, 34, 35, 36, 44, 45, 46, with a first RAKE and space-diversity combiner 761 coupled to each matched filter 24, 25, 26 having an impulse response matched to a first chip-sequence signal, and with respective RAKE and space-diversity combiners coupled to respective matched filters having impulse responses matched to respective chip-sequence signals. The plurality of RAKE and space-diversity combiners 761, 762, 763 combines, for a respective chip-sequence signal, the plurality of detected spread-spectrum signals and the multiplicity of detected-fading spread-spectrum signals from the plurality of matched filters 24, 25, 26, 34, 35, 36, 44, 45, 46. The combining generates a plurality of combined signals and a plurality of signal amplitudes, respectively. A first combined signal is from the first RAKE and space-diversity combiner 761, and respective combined signals are from respective RAKE and space-diversity combiners.

A multiplexer 765 is coupled to the plurality of RAKE and space diversity combiners 761, 762, 763. The multiplexer 765 multiplexes the plurality of combined signals, thereby generating a multiplexed signal. A de-interleaver 61 is coupled to the multiplexer 765 for de-interleaving the multiplexed signal from the multiplexer, thereby generating a de-interleaved signal. The decoder is coupled to the de-interleaver. The decoder 62 decodes the de-interleaved signal.

It will be apparent to those skilled in the art that various modifications can be made to the efficient shadow reduction antenna system for spread spectrum of the instant invention without departing from the scope or spirit of the invention, and it is intended that the present invention cover modifications and variations of the efficient shadow reduction antenna system for spread spectrum provided they come within the scope of the appended claims and their equivalents.

I claim:

1. A multiple-input-multiple-output (MIMO) method for receiving data having symbols, with the data having symbols demultiplexed into a plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively, with the plurality of spread-spectrum-subchannel signals radiated, using radio waves, from a plurality of antennas as a plurality of spread-spectrum signals, respectively, with the plurality of spread-spectrum signals passing through a communications channel having multipath, thereby generating, from the plurality of spread-spectrum signals, at least a first spread-spectrum signal having a first channel of data arriving from a first path of the multipath, and a second spread-spectrum signal having a second channel of data arriving from a second path of the multipath, comprising the steps of:

receiving the first spread-spectrum signal and the second spread-spectrum signal with a plurality of receiver antennas;

detecting, at each receiver antenna of the plurality of receiver antennas, the first spread-spectrum signal as a first plurality of detected spread-spectrum signals, respectively;

detecting, at each receiver antenna of the plurality of receiver antennas, the second spread-spectrum signal as a second plurality of detected spread-spectrum signals, respectively;

combining, from each receiver antenna of the plurality of receiver antennas, each of the first plurality of detected spread-spectrum signals, thereby generating a first combined signal; and combining, from each receiver antenna of the plurality of receiver antennas, each of the second plurality of detected spread-spectrum signals, thereby generating a second combined signal.

2. The MIMO method as set forth in claim 1, further comprising the step of multiplexing the first combined signal with the second combined signal, thereby generating a multiplexed signal.

3. The MIMO method, as set forth in claim 1, for receiving data having symbols, from the communications channel having multipath, thereby generating, from the plurality of spread-spectrum signals, a third spread-spectrum signal having a third channel of data arriving from any of the first path, the second path, or a third path of the multipath, further comprising the steps of:

receiving the third spread-spectrum signal with the plurality of receiver antennas;

detecting, at each receiver antenna of the plurality of receiver antennas, the third spread-spectrum signal, as a third plurality of detected spread-spectrum signals; and combining, from each receiver antenna of the plurality of receiver antennas, each of the third plurality of detected spread-spectrum signals, thereby generating a third combined signal.

4. The MIMO method as set forth in claim 3, further comprising the step of multiplexing the first combined signal, the second combined signal, and the third combined signal, thereby generating a multiplexed signal.

5. The MIMO method, as set forth in claim 3, for receiving data having symbols, from the communications channel having multipath, thereby generating, from the plurality of spread-spectrum signals, a fourth spread-spectrum signal having a fourth channel of data arriving from any of the first path, the second path, the third path, or a fourth path of the multipath, further comprising the steps of:
receiving the fourth spread-spectrum signal with the plurality of receiver antennas;
detecting, at each receiver antenna of the plurality of receiver antennas, the fourth spread-spectrum signal, as a fourth plurality of detected spread-spectrum signals; and
combining, from each receiver antenna of the plurality of receiver antennas, each of the fourth plurality of detected spread-spectrum signals, thereby generating a fourth combined signal.

6. The MIMO method as set forth in claim 5, further comprising the step of multiplexing the first combined signal, the second combined signal, the third combined signal, and the fourth combined signal, thereby generating a multiplexed signal.

7. The MIMO method, as set forth in claim 5, for receiving data having symbols, from the communications channel having multipath, thereby generating, from the plurality of spread-spectrum signals, a fifth spread-spectrum signal having a fifth channel of data arriving from any of the first path, the second path, the third path of the multipath, the fourth path, or a fifth path, further comprising the steps of:
receiving the fifth spread-spectrum signal with the plurality of receiver antennas;
detecting, at each receiver antenna of the plurality of receiver antennas, the fifth spread-spectrum signal, as a fifth plurality of detected spread-spectrum signals; and
combining, from each receiver antenna of the plurality of receiver antennas, each of the fifth plurality of detected spread-spectrum signals, thereby generating a fifth combined signal.

8. The MIMO method as set forth in claim 7, further comprising the step of multiplexing the first combined signal, the second combined signal, the third combined signal, the fourth combined signal, and the fifth combined signal, thereby generating a multiplexed signal.

9. A multiple-input-multiple-output (MIMO) system for receiving data having symbols, with the data having symbols demultiplexed into a plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively, with the plurality of spread-spectrum-subchannel signals radiated, using radio waves, from a plurality of antennas as a plurality of spread-spectrum signals, respectively, with the plurality of spread-spectrum signals passing through a communications channel having multipath, thereby generating, from the plurality of spread-spectrum signals, at least a first spread-spectrum signal having a first channel of data arriving from a first path of the multipath, and a second spread-spectrum signal having a second channel of data arriving from a second path of the multipath, comprising:
a plurality of receiver antennas for receiving the first spread-spectrum signal and the second spread-spectrum signal;
a plurality of despreading devices for detecting, at each receiver antenna of the plurality of receiver antennas, the first spread-spectrum signal and the second spread-spectrum signal, as a first plurality of detected spread-spectrum signals and a second plurality of detected spread-spectrum signals, respectively; and
a plurality of combiners for combining, from each receiver antenna of the plurality of receiver antennas, each of the first plurality of detected spread-spectrum signals, thereby generating a first combined signal, and for combining, from each receiver antenna of the plurality of receiver antennas, each of the second plurality of detected spread-spectrum signals, thereby generating a second combined signal.

10. The MIMO system as set forth in claim 9, further comprising a multiplexer for multiplexing the first combined signal with the second combined signal, thereby generating a multiplexed signal.

11. The MIMO system as set forth in claim 9, for receiving data having symbols, from the communications channel having multipath, thereby generating, from the plurality of spread-spectrum signals, a third spread-spectrum signal having a third channel of data arriving from any of the first path, the second path, or a third path of the multipath, further comprising:
said plurality of receiver antennas for receiving the third spread-spectrum signal;
said plurality of despreading devices for detecting, at each receiver antenna of the plurality of receiver antennas, the third spread-spectrum signal, as a third plurality of detected spread-spectrum signals; and
said plurality of combiners for combining, from each receiver antenna of the plurality of receiver antennas, each of the third plurality of detected spread-spectrum signals, thereby generating a third combined signal.

12. The MIMO system as set forth in claim 11, further comprising a multiplexer for multiplexing the first combined signal, the second combined signal, and the third combined signal, thereby generating a multiplexed signal.

13. The MIMO system, as set forth in claim 11, for receiving data having symbols, from the communications channel having multipath, thereby generating, from the plurality of spread-spectrum signals, a fourth spread-spectrum signal having a fourth channel of data arriving from any of the first path, the second path, the third path, or a fourth path of the multipath, further comprising:
said plurality of receiver antennas for receiving the fourth spread-spectrum signal;
said plurality of despreading devices for detecting, at each receiver antenna of the plurality of receiver antennas, the fourth spread-spectrum signal, as a fourth plurality of detected spread-spectrum signals; and
said plurality of combiners for combining, from each receiver antenna of the plurality of receiver antennas, each of the fourth plurality of detected spread-spectrum signals, thereby generating a fourth combined signal.

14. The MIMO system as set forth in claim 13, further comprising a multiplexer for multiplexing the first combined signal, the second combined signal, the third combined signal, and the fourth combined signal, thereby generating a multiplexed signal.

15. The MIMO system, as set forth in claim 13, for receiving data having symbols, from the communications channel having multipath, thereby generating, from the plurality of spread-spectrum signals, a fifth spread-spectrum signal having a fifth channel of data arriving from any of the first path, the second path, or the third path of the multipath, the fourth path, or a fifth path, further comprising:
said plurality of receiver antennas for receiving the fifth spread-spectrum signal;
said plurality of spread-spectrum detectors for detecting, at each receiver antenna of the plurality of receiver antennas, the fifth spread-spectrum signal, as a fifth plurality of detected spread-spectrum signals; and
said plurality of combiners for combining, from each receiver antenna of the plurality of receiver antennas, each of the fifth plurality of detected spread-spectrum signals, thereby generating a fifth combined signal.

16. The MIMO system set forth in claim 15, further comprising a multiplexer for multiplexing the first combined signal, the second combined signal, the third combined signal, the fourth combined signal, and the fifth combined signal, thereby generating a multiplexed signal.

17. A MIMO system for receiving data having symbols, with the data having symbols demultiplexed into a plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively, with the plurality of spread-spectrum-subchannel signals radiated, using radio waves, from a plurality of antennas as a plurality of spread-spectrum signals, respectively, with the plurality of spread-spectrum signals passing through a communications channel having multipath, thereby generating, from the plurality of spread-spectrum signals, at least a first spread-spectrum signal having a first channel of data arriving from a first path of the multipath, and a second spread-spectrum signal having a second channel of data arriving from a second path of the multipath, comprising:
receiver-antenna means for receiving the first spread-spectrum signal and the second spread-spectrum signal;
despreading means, coupled to said receiver-antenna means, for detecting, at each receiver antenna of the plurality of receiver antennas, the first spread-spectrum signal and the second spread-spectrum signal, as a first plurality of detected spread-spectrum signals and a second plurality of detected spread-spectrum signals, respectively; and
combiner means, coupled to said despreading means, for combining, from each receiver antenna of the plurality of receiver antennas, each of the first plurality of detected spread-spectrum signals, thereby generating a first combined signal, and for combining, from each receiver antenna of the plurality of receiver antennas, each of the second plurality of detected spread-spectrum signals, thereby generating a second combined signal.

18. The MIMO system as set forth in claim 17, further comprising multiplexer means for multiplexing the first combined signal with the second combined signal, thereby generating a multiplexed signal.

19. The MIMO system as set forth in claim 17, for receiving data having symbols, from the communications channel having multipath, thereby generating, from the plurality of spread-spectrum signals, a third spread-spectrum signal having a third channel of data arriving from any of the first path, the second path, or a third path of the multipath, further comprising:
said receiver-antenna means for receiving the third spread-spectrum signal;
said despreading means for detecting, at each receiver antenna of the plurality of receiver antennas, the third spread-spectrum signal, as a third plurality of detected spread-spectrum signals; and
said combiner means for combining, from each receiver antenna of the plurality of receiver antennas, each of the third plurality of detected spread-spectrum signals, thereby generating a third combined signal.

20. The MIMO method as set forth in claim 19, further comprising multiplexer means for multiplexing the first combined signal, the second combined signal, and the third combined signal, thereby generating a multiplexed signal.

21. The MIMO system, as set forth in claim 19, for receiving data having symbols, from the communications channel having multipath, thereby generating, from the plurality of spread-spectrum signals, a fourth spread-spectrum signal having a fourth channel of data arriving from any of the first path, the second path, the third path, or a fourth path of the multipath, further comprising:
said receiver-antenna means for receiving the fourth spread-spectrum signal;
said despreading means for detecting, at each receiver antenna of the plurality of receiver antennas, the fourth spread-spectrum signal, as a fourth plurality of detected spread-spectrum signals; and
said combiner means for combining, from each receiver antenna of the plurality of receiver antennas, each of the fourth plurality of detected spread-spectrum signals, thereby generating a fourth combined signal.

22. The MIMO system as set forth in claim 21, further comprising multiplexer means for multiplexing the first combined signal, the second combined signal, the third combined signal, and the fourth combined signal, thereby generating a multiplexed signal.

23. The MIMO system, as set forth in claim 21, for receiving data having symbols, from the communications channel having multipath, thereby generating, from the plurality of spread-spectrum signals, a fifth spread-spectrum signal having a fifth channel of data arriving from any of the first path, the second path, or the third path of the multipath, the fourth path, or a fifth path, further comprising:
said receiver-antenna means for receiving the fifth spread-spectrum signal;
said despreading means for detecting, at each receiver antenna of the plurality of receiver antennas, the fifth spread-spectrum signal, as a fifth plurality detected spread-spectrum signals; and
said combiner means for combining, from each receiver antenna of the plurality of receiver antennas, each of the fifth plurality of detected spread-spectrum signals, thereby generating a fifth combined signal.

24. The MIMO system as set forth in claim 23, further comprising multiplexer means for multiplexing the first combined signal, the second combined signal, the third combined signal, the fourth combined signal, and the fifth combined signal, thereby generating a multiplexed signal.

25. A multiple input multiple output (MIMO) method improvement, for transmitting data having symbols, over a communications channel, comprising the steps of:
demultiplexing the data into a plurality of subchannels of data;

spread-spectrum processing the plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively;

radiating from a plurality of antennas, using radio waves, the plurality of spread-spectrum-subchannel signals, over the communications channel, as a plurality of spread-spectrum signals, respectively;

imparting, from the communications channel, multipath on the plurality of spread-spectrum signals, thereby generating at least a first spread-spectrum signal having a first channel of data arriving from a first path of the multipath, and a second spread-spectrum signal having a second channel of data arriving from a second path of the multipath;

receiving the first spread-spectrum signal and the second spread-spectrum signal with a plurality of receiver antennas;

detecting, at each receiver antenna of the plurality of receiver antennas, the first spread-spectrum signal and the second spread-spectrum signal, as a first plurality of detected spread-spectrum signals and a second plurality of detected spread-spectrum signals, respectively;

combining, from each receiver antenna of the plurality of receiver antennas, each of the first plurality of detected spread-spectrum signals, thereby generating a first combined signal; and combining, from each receiver antenna of the plurality of receiver antennas, each of the second plurality of detected spread-spectrum signals, thereby generating a second combined signal.

26. The MIMO method as set forth in claim 25, further comprising the step of multiplexing the first combined signal with the second combined signal, thereby generating a multiplexed signal.

27. The MIMO method, as set forth in claim 25, for receiving data having symbols, from the communications channel having multipath, thereby generating, from the plurality of spread-spectrum signals, with a third spread-spectrum signal having a third channel of data arriving from any of the first path, the second path, or a third path of the multipath, further comprising the steps of:

receiving the third spread-spectrum signal with the plurality of receiver antennas;

detecting, at each receiver antenna of the plurality of receiver antennas, the third spread-spectrum signal, as a third plurality of detected spread-spectrum signals; and combining, from each receiver antenna of the plurality of receiver antennas, each of the third plurality of detected spread-spectrum signals, thereby generating a third combined signal.

28. The MIMO method as set forth in claim 27, further comprising the step of multiplexing the first combined signal, the second combined signal, and the third combined signal, thereby generating a multiplexed signal.

29. The MIMO method, as set forth in claim 27, for receiving data having symbols, from the communications channel having multipath, thereby generating, from the plurality of spread-spectrum signals, with a fourth spread-spectrum signal having a fourth channel of data arriving from any of the first path, the second path, the third path, or a fourth path of the multipath, further comprising the steps of:

receiving the fourth spread-spectrum signal with the plurality of receiver antennas;

detecting, at each receiver antenna of the plurality of receiver antennas, the fourth spread-spectrum signal, as a fourth plurality of detected spread-spectrum signals; and combining, from each receiver antenna of the plurality of receiver antennas, each of the fourth plurality of detected spread-spectrum signals, thereby generating a fourth combined signal.

30. The MIMO method as set forth in claim 29, further comprising the step of multiplexing the first combined signal, the second combined signal, the third combined signal, and the fourth combined signal, thereby generating a multiplexed signal.

31. The MIMO method, as set forth in claim 29, for receiving data having symbols, from the communications channel having multipath, thereby generating, from the plurality of spread-spectrum signals, a fifth spread-spectrum signal having a fifth channel of data arriving from any of the first path, the second path, the third path of the multipath, the fourth path, or a fifth path, further comprising the steps of:

receiving the fifth spread-spectrum signal with the plurality of receiver antennas;

detecting, at each receiver antenna of the plurality of receiver antennas, the fifth spread-spectrum signal, as a fifth plurality of detected spread-spectrum signals; and combining, from each receiver antenna of the plurality of receiver antennas, each of the fifth plurality of detected spread-spectrum signals, thereby generating a fifth combined signal.

32. The MIMO method as set forth in claim 31, further comprising the step of multiplexing the first combined signal, the second combined signal, the third combined signal, the fourth combined signal, and the fifth combined signal, thereby generating a multiplexed signal.

33. A multiple input multiple output (MIMO) system, for transmitting data having symbols, over a communications channel, comprising:

a demultiplexer for demultiplexing the data into a plurality of subchannels of data;

a plurality of spread-spectrum devices for spread-spectrum processing the plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively;

a plurality of transmitter antennas for radiating, using radio waves, the plurality of spread-spectrum-subchannel signals, over the communications channel, as a plurality of spread-spectrum signals, respectively;

said communications channel for imparting multipath on the plurality of spread-spectrum signals, thereby generating at least a first spread-spectrum signal having a first channel of data arriving from a first path of the multipath, and a second spread-spectrum signal having a second channel of data arriving from a second path of the multipath;

a plurality of receiver antennas for receiving the first spread-spectrum signal and the second spread-spectrum signal;

a plurality of despreading devices for detecting, at each receiver antenna of the plurality of receiver antennas, the first spread-spectrum signal and the second spread-spectrum signal, as a first plurality of detected spread-spectrum signals and a second plurality of detected spread-spectrum signals, respectively; and a plurality of combiners for combining, from each receiver antenna of the plurality of receiver antennas, each of the first plurality of detected spread-spectrum signals, thereby generating a first combined signal, and for combining, from each receiver antenna of the plurality of receiver antennas, each of the second plurality of detected spread-spectrum signals, thereby generating a second combined signal.

34. The MIMO system as set forth in claim 33, further comprising a multiplexer for multiplexing the first combined signal with the second combined signal, thereby generating a multiplexed signal.

35. The MIMO system as set forth in claim 33, for receiving data having symbols, from the communications channel having multipath, thereby generating, from the plurality of spread-spectrum signals, a third spread-spectrum signal having a third channel of data arriving from any of the first path, the second path, or a third path of the multipath, further comprising:
said plurality of receiver antennas for receiving the third spread-spectrum signal;
said plurality of despreading devices for detecting, at each receiver antenna of the plurality of receiver antennas, the third spread-spectrum signal, as a third plurality of detected spread-spectrum signals; and
said plurality of combiners for combining, from each receiver antenna of the plurality of receiver antennas, each of the third plurality of detected spread-spectrum signals, thereby generating a third combined signal.

36. The MIMO system as set forth in claim 35, further comprising a multiplexer for multiplexing the first combined signal, the second combined signal, and the third combined signal, thereby generating a multiplexed signal.

37. The MIMO system, as set forth in claim 35, for receiving data having symbols, from the communications channel having multipath, thereby generating, from the plurality of spread-spectrum signals, a fourth spread-spectrum signal having a fourth channel of data arriving from any of the first path, the second path, the third path, or a fourth path of the multipath, further comprising:
said plurality of receiver antennas for receiving the fourth spread-spectrum signal;
said plurality of despreading devices for detecting, at each receiver antenna of the plurality of receiver antennas, the fourth spread-spectrum signal, as a fourth plurality of detected spread-spectrum signals; and
said plurality of combiners for combining, from each receiver antenna of the plurality of receiver antennas, each of the fourth plurality of detected spread-spectrum signals, thereby generating a fourth combined signal.

38. The MIMO system as set forth in claim 37, further comprising a multiplexer for multiplexing the first combined signal, the second combined signal, the third combined signal, and the fourth combined signal, thereby generating a multiplexed signal.

39. The MIMO system, as set forth in claim 37, for receiving data having symbols, from the communications channel having multipath, thereby generating, from the plurality of spread-spectrum signals, a fifth spread-spectrum signal having a fifth channel of data arriving from any of the first path, the second path, or the third path of the multipath, the fourth path, or a fifth path, further comprising:
said plurality of receiver antennas for receiving the fifth spread-spectrum signal;
said plurality of spread-spectrum detectors for detecting, at each receiver antenna of the plurality of receiver antennas, the fifth spread-spectrum signal, as a fifth plurality of detected spread-spectrum signals; and
said plurality of combiners for combining, from each receiver antenna of the plurality of receiver antennas, each of the fifth plurality of detected spread-spectrum signals, thereby generating a fifth combined signal.

40. The MIMO system set forth in claim 39, further comprising a multiplexer for multiplexing the first combined signal, the second combined signal, the third combined signal, the fourth combined signal, and the fifth combined signal, thereby generating a multiplexed signal.

41. A multiple input multiple output (MIMO) system, for transmitting data having symbols, over a communications channel, comprising:
demultiplexer means for demultiplexing the data into a plurality of subchannels of data;
spread-spectrum processing means for spread-spectrum processing the plurality of subchannels of data, with the plurality of subchannels of data spread-spectrum processed with a plurality of chip-sequence signals, respectively, with each chip-sequence signal different from other chip-sequence signals in the plurality of chip-sequence signals, thereby generating a plurality of spread-spectrum-subchannel signals, respectively;
a plurality of transmitter-antenna means for radiating, using radio waves, the plurality of spread-spectrum-subchannel signals, over the communications channel, as a plurality of spread-spectrum signals, respectively;
said communications channel for imparting multipath on the plurality of spread-spectrum signals, thereby generating at least a first spread-spectrum signal having a first channel of data arriving from a first path of the multipath, and a second spread-spectrum signal having a second channel of data arriving from a second path of the multipath;
receiver-antenna means for receiving the first spread-spectrum signal and the second spread-spectrum signal;
despreading means, coupled to said receiver-antenna means, for detecting, at each receiver antenna of the plurality of receiver antennas, the first spread-spectrum signal and the second spread-spectrum signal, as a first plurality of detected spread-spectrum signals and a second plurality of detected spread-spectrum signals, respectively; and
combiner means, coupled to said despreading means, for combining, from each receiver antenna of the plurality of receiver antennas, each of the first plurality of detected spread-spectrum signals, thereby generating a first combined signal, and for combining, from each receiver antenna of the plurality of receiver antennas, each of the second plurality of detected spread-spectrum signals, thereby generating a second combined signal.

42. The MIMO system as set forth in claim 41, further comprising multiplexer means for multiplexing the first combined signal with the second combined signal, thereby generating a multiplexed signal.

43. The MIMO system as set forth in claim 41, for receiving data having symbols, from the communications channel having multipath, thereby generating, from the plurality of spread-spectrum signals, a third spread-spectrum signal having a third channel of data arriving from any of the first path, the second path, or a third path of the multipath, further comprising:

said receiver-antenna means for receiving the third spread-spectrum signal;

said despreading means for detecting, at each receiver antenna of the plurality of receiver antennas, the third spread-spectrum signal, as a third plurality of detected spread-spectrum signals; and said combiner means for combining, from each receiver antenna of the plurality of receiver antennas, each of the third plurality of detected spread-spectrum signals, thereby generating a third combined signal.

44. The MIMO system as set forth in claim 43, further comprising multiplexer means for multiplexing the first combined signal, the second combined signal, and the third combined signal, thereby generating a multiplexed signal.

45. The MIMO system, as set forth in claim 43, for receiving data having symbols, from the communications channel having multipath, thereby generating, from the plurality of spread-spectrum signals, a fourth spread-spectrum signal having a fourth channel of data arriving from any of the first path, the second path, the third path, or a fourth path of the multipath, further comprising:

said receiver-antenna means for receiving the fourth spread-spectrum signal;

said despreading means for detecting, at each receiver antenna of the plurality of receiver antennas, the fourth spread-spectrum signal, as a fourth plurality of detected spread-spectrum signals; and said combiner means for combining, from each receiver antenna of the plurality of receiver antennas, each of the fourth plurality of detected spread-spectrum signals, thereby generating a fourth combined signal.

46. The MIMO system as set forth in claim 45, further comprising multiplexer means for multiplexing the first combined signal, the second combined signal, the third combined signal, and the fourth combined signal, thereby generating a multiplexed signal.

47. The MIMO system, as set forth in claim 45, for receiving data having symbols, from the communications channel having multipath, thereby generating, from the plurality of spread-spectrum signals, a fifth spread-spectrum signal having a fifth channel of data arriving from any of the first path, the second path, or the third path of the multipath, the fourth path, or a fifth path, further comprising:

said receiver-antenna means for receiving the fifth spread-spectrum signal;

said despreading means for detecting, at each receiver antenna of the plurality of receiver antennas, the fifth spread-spectrum signal, as a fifth plurality detected spread-spectrum signals; and said combiner means for combining, from each receiver antenna of the plurality of receiver antennas, each of the fifth plurality of detected spread-spectrum signals, thereby generating a fifth combined signal.

48. The MIMO system as set forth in claim 47, further comprising multiplexer means for multiplexing the first combined signal, the second combined signal, the third combined signal, the fourth combined signal, and the fifth combined signal, thereby generating a multiplexed signal.

49. The MIMO method as set forth in claim 1 with the step of detecting the first spread-spectrum signal and the second spread-spectrum signal, including the step of detecting, responsive to a first chip-sequence signal and to a second chip-sequence signal, the first spread-spectrum signal and the second spread-spectrum signal as the first plurality of detected spread-spectrum signals and the second plurality of detected spread-spectrum signals, respectively.

50. The MIMO method as set forth in claim 3 with the step of detecting the third spread-spectrum signal, including the step of detecting, responsive to a third chip-sequence signal, the third spread-spectrum signal as the third plurality of detected spread-spectrum signals, respectively.

51. The MIMO method as set forth in claim 5 with the step of detecting the fourth spread-spectrum signal, including the step of detecting, responsive to a fourth chip-sequence signal, the fourth spread-spectrum signal as the fourth plurality of detected spread-spectrum signals, respectively.

52. The MIMO method as set forth in claim 7 with the step of detecting the fifth spread-spectrum signal, including the step of detecting, responsive to a fifth chip-sequence signal, the fifth spread-spectrum signal as the fifth plurality of detected spread-spectrum signals, respectively.

53. The MIMO system as set forth in claim 9 with said plurality of despreading devices, responsive to a first chip-sequence signal and to a second chip-sequence signal, for detecting the first spread-spectrum signal and the second spread-spectrum signal as the first plurality of detected spread-spectrum signals and the second plurality of detected spread-spectrum signals, respectively.

54. The MIMO method as set forth in claim 11 with said plurality of despreading devices, responsive to a third chip-sequence signal, for detecting the third spread-spectrum signal as the third plurality of detected spread-spectrum signals, respectively.

55. The MIMO system as set forth in claim 13 with said plurality of despreading devices, responsive to a fourth chip-sequence signal, for detecting the fourth spread-spectrum signal as the fourth plurality of detected spread-spectrum signals, respectively.

56. The MIMO system as set forth in claim 15 with said plurality of despreading devices, responsive to a fifth chip-sequence signal, for detecting the fifth spread-spectrum signal as the fifth plurality of detected spread-spectrum signals, respectively.

57. The MIMO system as set forth in claim 17 with said despreading means, responsive to a first chip-sequence signal and to a second chip-sequence signal, for detecting the first spread-spectrum signal and the second spread-spectrum signal as the first plurality of detected spread-spectrum signals and the second plurality of detected spread-spectrum signals, respectively.

58. The MIMO system as set forth in claim 19 with said despreading means, responsive to a third chip-sequence signal, for detecting the third spread-spectrum signal as the third plurality of detected spread-spectrum signals, respectively.

59. The MIMO system as set forth in claim 21 with said despreading means, responsive to a fourth chip-sequence signal, for detecting the fourth spread-spectrum signal as the fourth plurality of detected spread-spectrum signals, respectively.

60. The MIMO system as set forth in claim 23 with said despreading means, responsive to a fifth chip-sequence signal, for detecting the fifth spread-spectrum signal as the fifth plurality of detected spread-spectrum signals, respectively.

61. The MIMO method as set forth in claim 25 with the step of detecting the first spread-spectrum signal and the second spread-spectrum signal, including the step of detecting, responsive to a first chip-sequence signal and to a second chip-sequence signal, the first spread-spectrum signal and the second spread-spectrum signal as the first plurality of detected spread-spectrum signals and the second plurality of detected spread-spectrum signals, respectively.

62. The MIMO method as set forth in claim 27 with the step of detecting the third spread-spectrum signal, including the step of detecting, responsive to a third chip-sequence signal, the third spread-spectrum signal as the third plurality of detected spread-spectrum signals, respectively.

63. The MIMO method as set forth in claim 29 with the step of detecting the fourth spread-spectrum signal, including the step of detecting, responsive to a fourth chip-sequence signal, the fourth spread-spectrum signal as the fourth plurality of detected spread-spectrum signals, respectively.

64. The MIMO method as set forth in claim 31 with the step of detecting the fifth spread-spectrum signal, including the step of detecting, responsive to a fifth chip-sequence signal, the fifth spread-spectrum signal as the fifth plurality of detected spread-spectrum signals, respectively.

65. The MIMO system as set forth in claim 33 with said plurality of despreading devices, responsive to a first chip-sequence signal and to a second chip-sequence signal, for detecting the first spread-spectrum signal and the second spread-spectrum signal as the first plurality of detected spread-spectrum signals and the second plurality of detected spread-spectrum signals, respectively.

66. The MIMO system as set forth in claim 35 with said plurality of despreading devices, responsive to a third chip-sequence signal, for detecting the third spread-spectrum signal as the third plurality of detected spread-spectrum signals, respectively.

67. The MIMO system as set forth in claim 37 with said plurality of despreading devices, responsive to a fourth chip-sequence signal, for detecting the fourth spread-spectrum signal as the fourth plurality of detected spread-spectrum signals, respectively.

68. The MIMO system as set forth in claim 39 with said plurality of despreading devices, responsive to a fifth chip-sequence signal, for detecting the fifth spread-spectrum signal as the fifth plurality of detected spread-spectrum signals, respectively.

69. The MIMO system as set forth in claim 41 with said despreading means, responsive to a first chip-sequence signal and to a second chip-sequence signal, for detecting the first spread-spectrum signal and the second spread-spectrum signal as the first plurality of detected spread-spectrum signals and the second plurality of detected spread-spectrum signals, respectively.

70. The MIMO system as set forth in claim 42 with said despreading means, responsive to a third chip-sequence signal, for detecting the third spread-spectrum signal as the third plurality of detected spread-spectrum signals, respectively.

71. The MIMO system as set forth in claim 43 with said despreading means, responsive to a fourth chip-sequence signal, for detecting the fourth spread-spectrum signal as the fourth plurality of detected spread-spectrum signals, respectively.

72. The MIMO system as set forth in claim 44 with said despreading means, responsive to a fifth chip-sequence signal, for detecting the fifth spread-spectrum signal as the fifth plurality of detected spread-spectrum signals, respectively.

73. The MIMO method as set forth in claim 1 with the step of detecting the first spread-spectrum signal and the second spread-spectrum signal, including the step of detecting, using a first filter matched to a first chip-sequence signal and a second filter matched to a second chip-sequence signal, the first spread-spectrum signal and the second spread-spectrum signal as the first plurality of detected spread-spectrum signals and the second plurality of detected spread-spectrum signals, respectively.

74. The MIMO method as set forth in claim 3 with the step of detecting the third spread-spectrum signal, including the step of detecting, using a third filter matched to a third chip-sequence signal, the third spread-spectrum signal as the third plurality of detected spread-spectrum signals, respectively.

75. The MIMO method as set forth in claim 5 with the step of detecting the fourth spread-spectrum signal, including the step of detecting, using a fourth filter matched to a fourth chip-sequence signal, the fourth spread-spectrum signal as the fourth plurality of detected spread-spectrum signals, respectively.

76. The MIMO method as set forth in claim 7 with the step of detecting the fifth spread-spectrum signal, including the step of detecting, using a fifth filter matched to a fifth chip-sequence signal, the fifth spread-spectrum signal as the fifth plurality of detected spread-spectrum signals, respectively.

77. The MIMO system as set forth in claim 9 with said plurality of despreading devices including a first filter matched to a first chip-sequence signal and a second filter matched to a second chip-sequence signal, for detecting the first spread-spectrum signal and the second spread-spectrum signal as the first plurality of detected spread-spectrum signals and the second plurality of detected spread-spectrum signals, respectively.

78. The MIMO system as set forth in claim 13 with said plurality of despreading devices including a third filter matched to a third chip-sequence signal, for detecting the third spread-spectrum signal as the third plurality of detected spread-spectrum signals, respectively.

79. The MIMO system as set forth in claim 13 with said plurality of despreading devices including a fourth filter matched to a fourth chip-sequence signal, for detecting the fourth spread-spectrum signal as the fourth plurality of detected spread-spectrum signals, respectively.

80. The MIMO system as set forth in claim 15 with said plurality of despreading devices including a fifth filter matched to a fifth chip-sequence signal, for detecting the fifth spread-spectrum signal as the fifth plurality of detected spread-spectrum signals, respectively.

81. The MIMO system as set forth in claim 17 with said despreading means including a first filter matched to a first chip-sequence signal and a second filter matched to a second chip-sequence signal, for detecting the first spread-spectrum signal and the second spread-spectrum signal as the first plurality of detected spread-spectrum signals and the second plurality of detected spread-spectrum signals, respectively.

82. The MIMO system as set forth in claim 19 with said despreading means including a third filter matched to a third chip-sequence signal, for detecting the third spread-spectrum signal as the third plurality of detected spread-spectrum signals, respectively.

83. The MIMO system as set forth in claim 21 with said despreading means including a fourth filter matched to a fourth chip-sequence signal, for detecting the fourth spread-spectrum signal as the fourth plurality of detected spread-spectrum signals, respectively.

84. The MIMO system as set forth in claim 23 with said despreading means including a fifth filter matched to a fifth chip-sequence signal, for detecting the fifth spread-spectrum signal as the fifth plurality of detected spread-spectrum signals, respectively.

85. The MIMO method as set forth in claim 25 with the step of detecting the first spread-spectrum signal and the second spread-spectrum signal, including the step of detecting, using a first filter matched to a first chip-sequence signal and a second filter matched to a second chip-sequence signal, the first spread-spectrum signal and the second spread-spectrum signal as the first plurality of detected spread-spectrum signals and the second plurality of detected spread-spectrum signals, respectively.

86. The MIMO method as set forth in claim 27 with the step of detecting the third spread-spectrum signal, including the step of detecting, using a third filter matched to a third chip-sequence signal, the third spread-spectrum signal as the third plurality of detected spread-spectrum signals, respectively.

87. The MIMO method as set forth in claim 29 with the step of detecting the fourth spread-spectrum signal, including the step of detecting, using a fourth filter matched to a fourth chip-sequence signal, the fourth spread-spectrum signal as the fourth plurality of detected spread-spectrum signals, respectively.

88. The MIMO method as set forth in claim 31 with the step of detecting the fifth spread-spectrum signal, including the step of detecting, using a fifth filter matched to a fifth chip-sequence signal, the fifth spread-spectrum signal as the fifth plurality of detected spread-spectrum signals, respectively.

89. The MIMO system as set forth in claim 33 with said plurality of despreading devices including a first filter matched to a first chip-sequence signal and a second filter matched to a second chip-sequence signal, for detecting the first spread-spectrum signal and the second spread-spectrum signal as the first plurality of detected spread-spectrum signals and the second plurality of detected spread-spectrum signals, respectively.

90. The MIMO system as set forth in claim 35 with said plurality of despreading devices, including a third filter matched to a third chip-sequence signal, for detecting the third spread-spectrum signal as the third plurality of detected spread-spectrum signals, respectively.

91. The MIMO system as set forth in claim 37 with said plurality of despreading devices including a fourth filter matched to a fourth chip-sequence signal, for detecting the fourth spread-spectrum signal as the fourth plurality of detected spread-spectrum signals, respectively.

92. The MIMO system as set forth in claim 39 with said plurality of despreading devices including a fifth filter matched to a fifth chip-sequence signal, for detecting the fifth spread-spectrum signal as the fifth plurality of detected spread-spectrum signals, respectively.

93. The MIMO system as set forth in claim 41 with said despreading means including a first filter matched to a first chip-sequence signal and a second filter matched to a second chip-sequence signal, for detecting the first spread-spectrum signal and the second spread-spectrum signal as the first plurality of detected spread-spectrum signals and the second plurality of detected spread-spectrum signals, respectively.

94. The MIMO system as set forth in claim 42 with said despreading means including a third filter matched to a third chip-sequence signal, for detecting the third spread-spectrum signal as the third plurality of detected spread-spectrum signals, respectively.

95. The MIMO system as set forth in claim 43 with said despreading means including a fourth filter matched to a fourth chip-sequence signal, for detecting the fourth spread-spectrum signal as the fourth plurality of detected spread-spectrum signals, respectively.

96. The MIMO system as set forth in claim 44 with said despreading means including a fifth filter matched to a fifth chip-sequence signal, for detecting the fifth spread-spectrum signal as the fifth plurality of detected spread-spectrum signals, respectively.

\* \* \* \* \*